Jan. 29, 1963 C. J. ARNDT ET AL 3,075,631
SUPPORTING STRUCTURE FOR BELT CONVEYOR
Filed Nov. 5, 1958 3 Sheets-Sheet 1
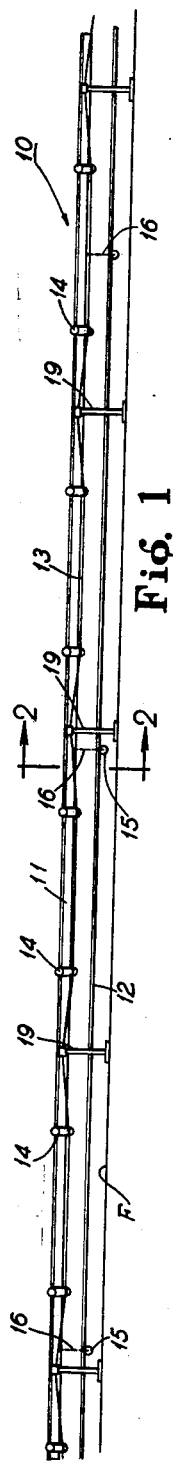
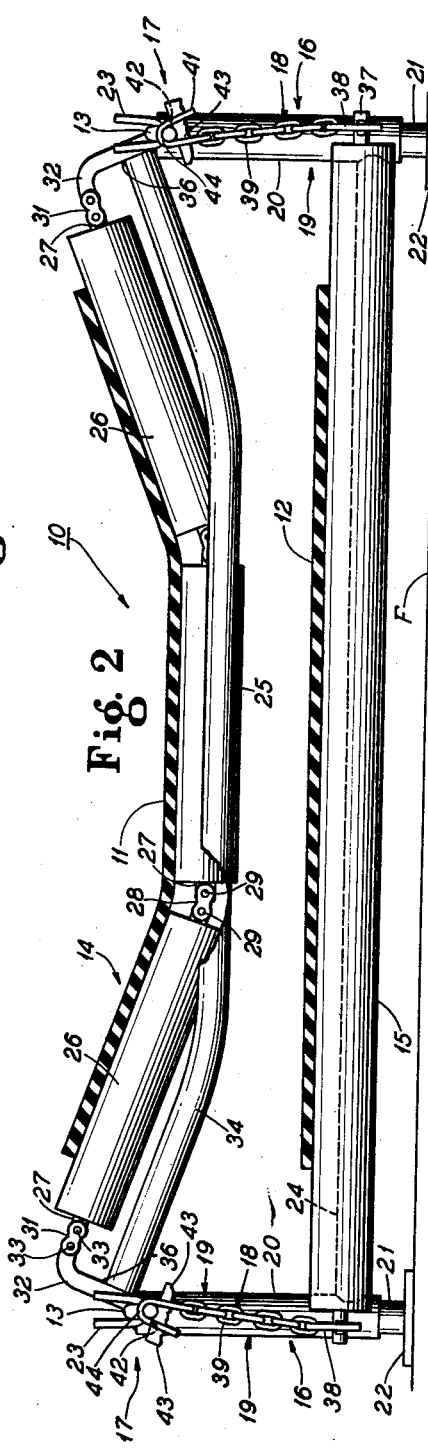
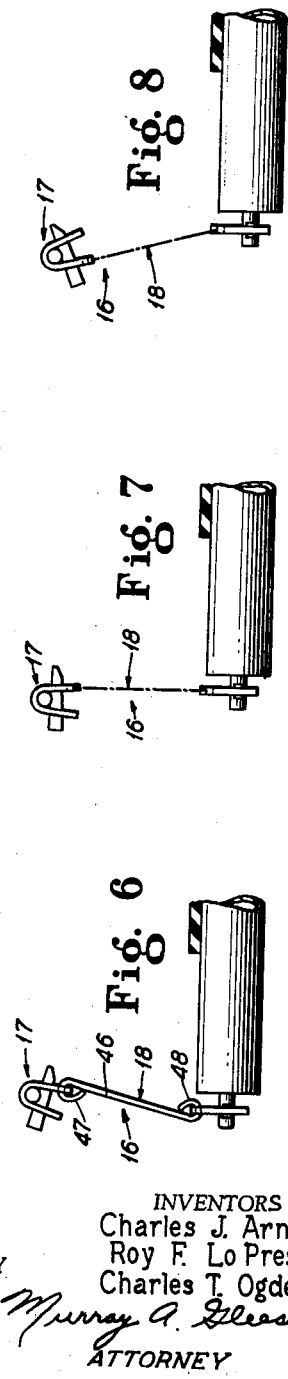
INVENTORS
Charles J. Arndt
Roy F. Lo Presti
Charles T. Ogden
BY
Murray A. Gleeson
ATTORNEY

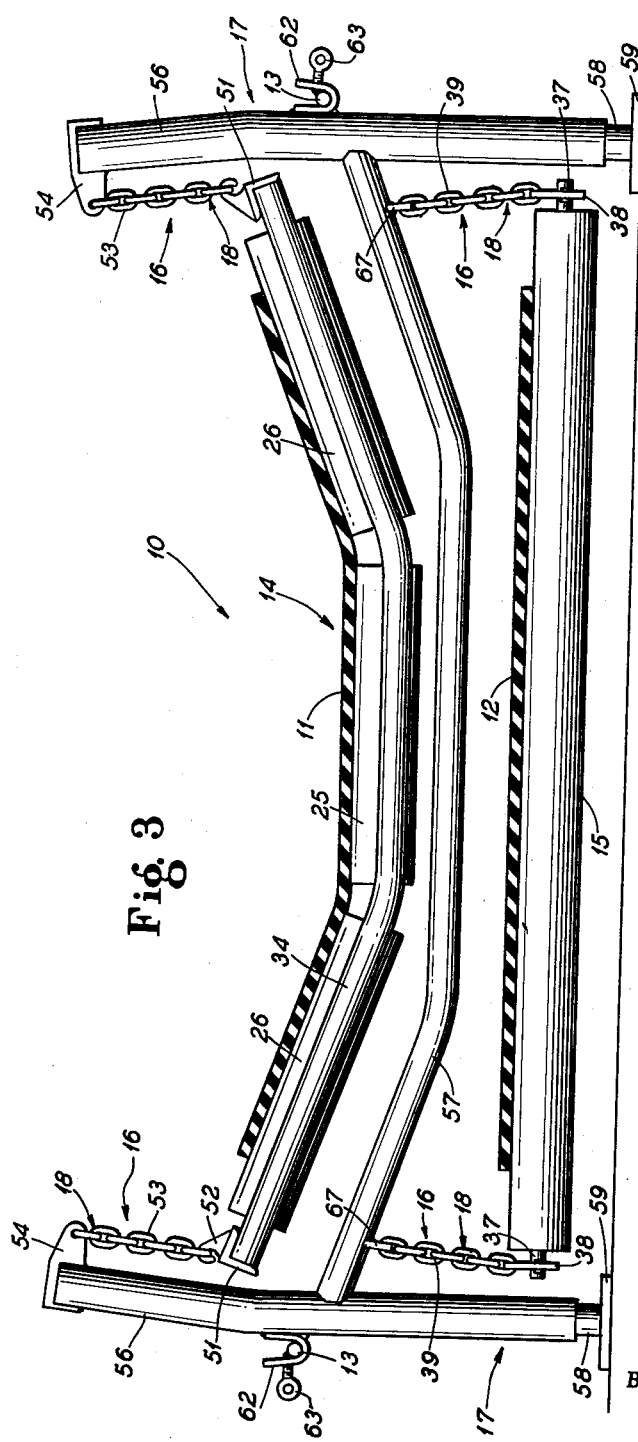
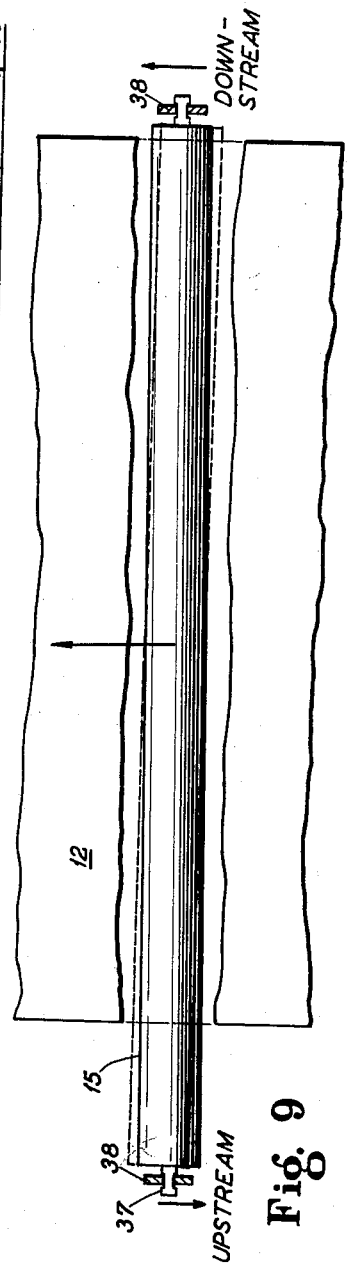

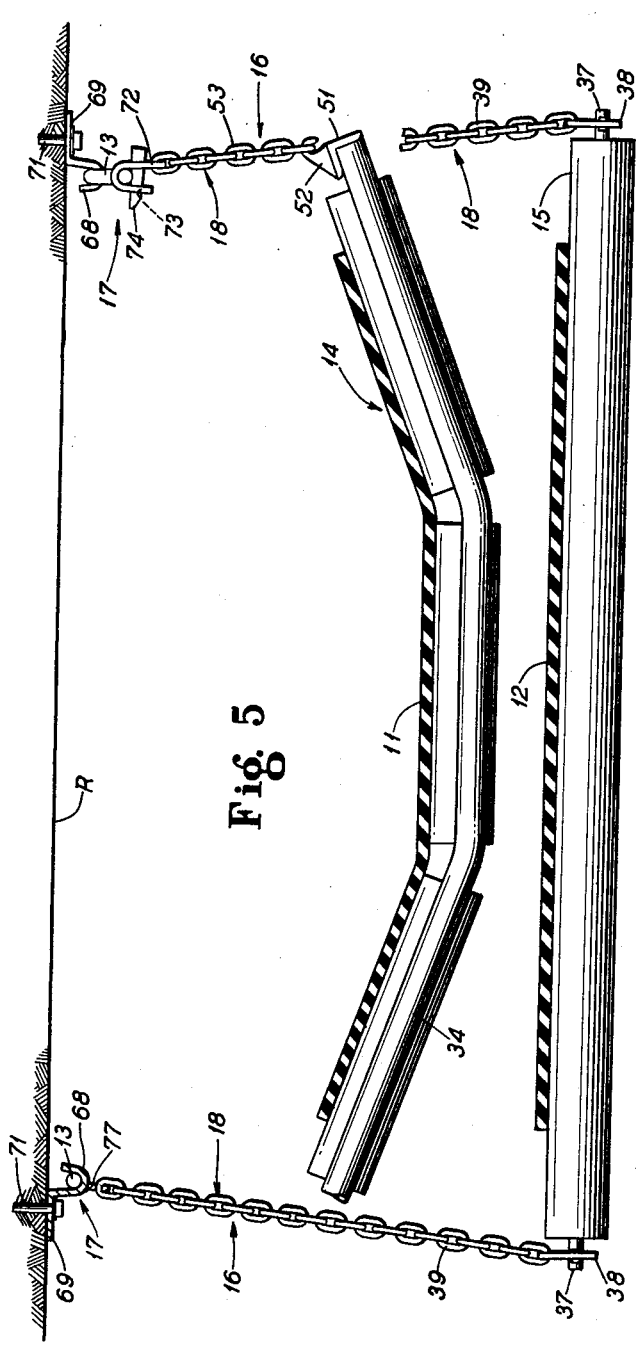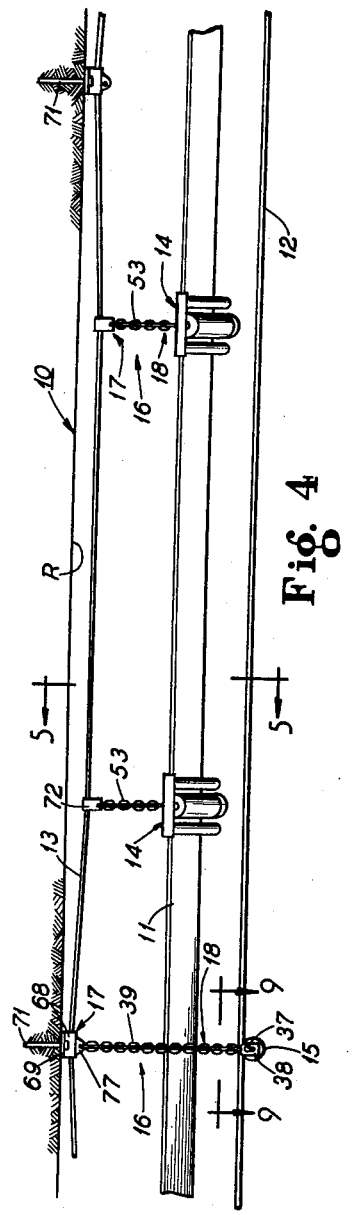

United States Patent Office 3,075,631
Patented Jan. 29, 1963

3,075,631
SUPPORTING STRUCTURE FOR BELT CONVEYOR
Charles J. Arndt, Harvey, and Roy F. Lo Presti and Charles T. Ogden, Chicago, Ill., assignors to Goodman Manufacturing Company, Chicago, Ill., a corporation of Illinois
Filed Nov. 5, 1958, Ser. No. 772,106
6 Claims. (Cl. 198—192)

This invention relates generally to belt conveyors and more particularly to an improved supporting structure for supporting the conveying and return reaches of the conveyor belt in such a fashion as to provide proper training at all times.

We have found that the amount of re-training effect is dependent upon the manner in which the roller assemblies which support the reaches of the conveyor belt are suspended and have provided an improved supporting structure for supporting the roller assemblies of a flexible sideframe conveyor in a manner to enable the end portions of the roller assemblies to freely move to and fro relative to the direction in which the conveyor belt is moving thereacross. The improved supporting structure includes a primary support which may be either rigid or flexible having an elongated connector device depending therefrom for suspending and supporting the roller assemblies from the primary support. The connector devices for suspending and supporting each roller assembly may be bodily flexible in the form of lengths of chains or bodily rigid in the form of rods or links which are each connected at the upper ends to the primary support and at the other ends to the end portions of the roller assembly. If the connector devices converge upwardly from the end portions of the roller assembly and toward the primary support, a maximum re-training effect is provided for the conveyor belt. If the devices diverge upwardly from the points of connection at the roller assembly towards the primary support, a minimum re-training effect is provided. If the connector devices are suspended substantially vertically a re-training effect less than the first manner of suspension and more than the second manner of suspension is provided.

In all of the manners of suspension and disposition of the connector devices, as disclosed and described above, there is a definite desired increase over the re-training effect on an offcenter reach of a conveyor belt when compared to a connection between the roller assemblies and a support which is disposed substantially horizontal. It has been found that a substantially vertically, i.e. more vertical than horizontal, disposed connector device will give a greater and increased re-training effect than a generally horizontally disposed connection with the re-training effect being greater if the connector devices are disposed in upwardly convergent relationship to each other with the total maximum effect depending on the length of the connector devices and the degree to which the connector devices converge toward each other.

In any of the aforesaid modifications of suspending and supporting a roller assembly, the assembly may move so that the longitudinal axis of the roller assembly is skewed relative to the conveyor course to give a corrective component of force to the reach of the moving conveyor belt. For example, if the reach moves towards one end of the roller assembly, that end of the roller assembly will move "downstream" in the direction of movement of the belt reach to correct such misalignment. In the modification where the connector devices for the roller assembly extend in convergent directions upwardly away from the roller assembly, the roller assembly appears to swing about a mid-point in the roller assembly with that part of the roller assembly in greater contact with the reach swinging "downstream" and the remaining part "upstream." Where the connector devices for the roller assembly converge downwardly toward the roller assembly, the end of the roller assembly having the greater contact with the reach swings in a "downstream" direction and the remaining part of the assembly moves a lesser degree in the "downstream" direction to give a skewed result. Where the connector devices for the roller assembly depend substantially vertically generally normal to the longitudinal axis of the roller assembly, the end of the roller assembly that is in greater contact with the reach swings in a "downstream" direction and the other end appears to remain relatively stationary.

By employing the improved supporting structure of this invention it is possible to support the conveyor belt at spaced locations along the conveyor course in such a fashion that proper training is given to the conveyor belt at all times. The amount of such training effect differs in accordance with the mode of supporting and suspending the roller assembly, as stated above.

We have also found it possible to support the return reach of the belt at fewer points and at greater space intervals than has been taught heretofore, the spacing of the supporting structure for the return reach being dictated by the terrain over which the conveyor operates and by the weight of the conveyor belt. In the case of a conveyor having the conveying reach supported upon laterally spaced flexible strands the supporting structure for the return roller assemblies may be suspended freely from the flexible strands. In other cases, it may be convenient to support the return reach of the conveyor belt by suspending the return roller assemblies from a rigid support stand or from the roof in the case of underground mining operations.

With the foregoing considerations in mind, it is a principal object of this invention to provide a belt conveyor having roller assemblies which support the reaches of the conveyor belt with an improved supporting structure for supporting the roller assemblies in a pendant fashion with the roller assemblies for such reaches being able to move in directions which will automatically correct misalignment of an offcenter reach of the conveyor belt.

Another object of this invention is to support both the conveying and return reaches of a belt conveyor by improved supporting structure which enables movement to correct misalignment of the reaches.

Still another object of this invention is to provide a belt conveyor with supporting structure which supports the return reach only as often as necessary as dictated by the weight of the return reach and the terrain over which the conveyor operates with the supporting structure for the return reach being capable of correcting any tendency of misalignment of a portion of the return reach which may be offcenter.

In order to acquire and accomplish the desired objects, as stated above, the present invention provides an improved supporting structure for supporting the elongated roller assemblies of a flexible strand sideframe conveyor so that the end portions of the roller assemblies may move to and fro relative to the given course along which the conveyor is trained in response to an offcenter reach of the conveyor belt which is passing over the roller assemblies and enable the roller assemblies to compensate, at least in part, for such offcenter condition and train such reach of the belt in response to the offcenter condition itself. The improved supporting structure of this invention includes a primary support means which may be either flexible, such as the flexible strand sideframes of the conveyor or rigid in the form of ground supported upstanding stands or roof bolt anchors which are secured to the ground. An elongated connector device is positioned between the primary support means and the end portions of the roller assemblies and the connector devices may be either bodily flexible in the form of lengths of chain or flexible cables or bodily rigid in the form of an elongated rod or link which is swivelably connected between the primary support means and the end portions of the roller assemblies.

Other objects and important features of the invention will be apparent from a study of the specification following taken with the drawing which together describe and illustrate a number of preferred embodiments of the invention and what are now considered to be the best modes of practicing the principles thereof. Other embodiments may be suggested to those having the benefit of the teachings herein, and such embodiments are intended to be reserved especially as they fall within the scope and purview of the subjoined claims.

In the drawing:

FIGURE 1 is a longitudinal elevational view of a portion of a belt conveyor embodying the improvements according to the present invention;

FIGURE 2 is a sectional elevational view looking in the direction of the arrows 2—2 of FIGURE 1;

FIGURE 3 is a sectional elevational view of a modification of the supporting structure in the form of a support stand illustrating how both the conveying and return reaches may be suspended therefrom;

FIGURE 4 is a longitudinal elevational view, similar to FIG. 1, showing a portion of a conveyor having a still further modification of the supporting structure for supporting the reaches of the conveyor belt;

FIGURE 5 is a sectional elevational veiw, with portions broken away, looking in the direction of the arrows 5—5 of FIGURE 4;

FIGURE 6 is a fragmentary sectional elevational view showing another modification of supporting and suspending a roller assembly of the belt conveyor;

FIGURE 7 is a view similar to FIGURE 6 but showing another modification of suspending the roller assembly;

FIGURE 8 is a view similar to FIGURES 6 and 7 and showing still another modification of suspending the roller assembly; and FIGURE 9 is a plan view showing how a roller assembly which is suspended by the supporting structure may move in a generally horizontal plane to provide a corrective re-training effect to an offcenter portion of a reach of the conveyor belt which is supported thereby.

Attention is now directed to the drawing wherein there is illustrated an endless belt conveyor 10 of the flexible strand sideframe type having a load carrying conveying reach 11 and a return reach 12 which are guided along a given conveyor course by a pair of laterally spaced generally parallel flexible strands 13—13 each of whcih are supported at space intervals throughout their length along the given course. In each of the modifications of this invention, to be more fully disclosed and described hereinafter, the conveying reach 11 is supported by elongated troughing roller assemblies 14 and the return reach 12 is supported by elongated return roller assemblies 15 and, as desired, the roller assemblies 14 and 15 may be suspended and supported through an improved supporting structure 16 which includes primary support means 17 and elongated free hanging connector devices 18 which will enable the end portions of the roller assemblies 14 and 15 to freely swing to and fro relative to the given course of the belt conveyor 10 in response to an offcenter reach which may be passing thereacross to effectively compensate, at least in part, and re-train such reach and correct the offcenter condition in response to the condition itself.

Attention is now directed to the modification of the invention as illustrated in FIGS. 1 and 2 wherein the strands 13—13 are supported by a plurality of support stands 19 each of which includes a pair of laterally spaced sleeve-like uprights 20 into which is telescoped upright members 21 having ground engaging feet 22 resting upon a mine floor F or the like. Each of the sleeve-like uprights 20 has a U-shaped saddle 23 and at the top thereof for receiving the flexible strand 13 and the members 20 are maintained in properly spaced relationship by means of a laterally extending strut 24. Means, not shown, can be provided for adjusting the position of the telescoping uprights 20 and 21 in accordance with the desired height of the belt conveyor 10 and the irregularities in the mine floor F.

Each of the troughing roller assemblies 14 is flexible intermediate the end portions thereof and may consist of a center load supporting roller 25 flanked at its ends by inclined wing rollers 26. Each of the rollers turns upon a shaft 27 and each of the wing rollers 26 is joined for articulating movement in a generally vertical plane to the center load supporting roller 25 by means of links 28, each end of which has a pin connection 29 to the respective shafts 27.

The extreme ends of the wing rollers 26 are connected by a pair of links 31 to a bracket 32 secured in any convenient fashion to the rope strand 13. The links 31 are pin connected at 33 to the bracket 32 and the shaft 27 of the wing roller 26 for articulating movement in a generally vertical plane.

The wing rollers 26 and the center load supporting roller 25 are flanked by relatively rigid strut members 34 welded at each end to the brackets 32 as at 36 to restrain movement of the end portions of the troughing roller assembly 14 toward and away from each other.

In the past, as disclosed in Craggs et al., U.S. Patent No. 2,773,527 and improvement patents thereunder, the return roller assemblies 15 have been rigidly supported directly from the stands 19. We have found, however, that it is not necessary to provide a return roller assembly 15 at each support stand 19, note FIG. 1, and that it is necessary only to provide a return roller assembly as may be dictated by the terrain over which the belt conveyor 10 operates and by the weight of the return reach 12, so that the return reach does not sag unduly between the locations at which the return reach is supported. Moreover, we have found that it is possible to support the return roller assemblies 15 in a pendant fashion by the supporting structure 16 so that the end portions thereof are unrestrained for movement in a generally horizontal plane to and fro relative to the conveyor course and will adopt a position which will correct any tendency of the return reach 12 to become misaligned.

In the modification of the invention as seen in FIGS. 1 and 2, the improved supporting structure 16 for suspending and supporting each of the return roller assemblies, as described above, provides that the primary support means 17 is flexible and in the form of the flexible strand sideframes 13—13 of the belt conveyor 10 and that the connector devices 18 are bodily flexible in the form of lengths of link chain 39, as illustrated, or the connector devices 18 may take the form of lengths of cable or strand, not illustrated. The elongated return roller assembly 15 is relatively rigid and includes a shaft 37, each end of which is supported in a bracket 38 with the flexible chains 39 being swivelably or universably connected to the respective bracket 38. A generally U-shaped hook 41 is carried at the upper end of each chain 39 for suspending the return roller assembly 15 from the flexible support strands 13—13. Each of the hooks 41 has a pair of aligned apertures 42 therein and a locking wedge or pin 43 is driven into the apertures 42 so that the strand 13 is firmly engaged in a bight 44 of each hook 41.

Referring now to FIGURE 3 of the drawing wherein there is shown a modification of construction whereby the conveying reach 11 and the return reach 12 are both supported upon roller assemblies which are suspended and supported by the improved supporting structures 16 to enable the end portions of the roller assemblies to have free swiveling movement in a generally horizontal plane to and fro relative to the conveyor course to correct the misalignment of the reaches. As seen in FIGURE 3, the conveying reach 11 is supported by the troughing roller assembly 14 having the center load supporting roller 25 and the inclined wing or troughing rollers 26 flanked at each side by the strut members 34 which are welded at their ends to an angle member 51 which restricts movement of the end portions of the roller assembly 14 relative to each other. The outer ends of the wing rollers 26 are connected for articulating movement to the angle members 51 by means, not shown, similar to the means shown at 31 in FIGURE 2.

A lug 52 is welded to each of the angle members 51 to provide a connection for the connector device 18, such as a chain 53, which is connected at its upper end to a bracket 54 extending inward from the primary support means 17 which, in this modification, is in the form of a rigid standard 56. The standards 56 are maintained in laterally spaced relationship by a strut member 57 and are telescopically engaged with members 58 having ground engaging feet 59, and means, not shown, may be provided for adjusting the position of the members 58 with respect to the standards 56.

The standards 56 are properly aligned by the flexible strands 13—13 which are supported upon U-shaped saddles 62. The strands 13—13 extend longitudinally of the belt conveyor 10 and are in laterally spaced relationship and provide a guide for properly aligning the conveying 11 and return 12 reaches of the belt conveyor along the conveyor course.

When the standards 56 are properly aligned they can be locked to each strand 13 by means of an eye screw 63 threaded into one limb of the U-shaped saddle 62.

The return reach 12 is supported upon the rigid return roller assembly 15 which is also supported pendantly from the rigid primary support means 17, i.e., the standards 56, by the strut member 57. Each end of the shaft 37 for the return roller assembly 15 has the bracket 38 connected to the connector device 18 which is in the form of the chain 39 connected at its upper end to a lug 67 welded to the under side of the strut 57.

Referring now to FIGURES 4 and 5 of the drawing, there is shown another modification of this invention wherein the belt conveyor 10 may be supported from a mine roof R or the like. In this embodiment of the invention the laterally spaced strands 13—13 are supported upon generally U-shaped brackets 68 each having a generally horizontally extending limb 69 which may be secured to the mine roof R as by roof bolts 71.

The troughing roller assemblies 14 are suspended and supported by the supporting structure 16 which in this modification has the primary supporting means 17 flexible in the form of the strands 13—13 and the connector devices 18 are bodily flexible in the form of lengths of link chain 53 which are suspended from a U-shaped hanger 72 supported in turn upon the strand 13. The U-shaped hanger 72 has aligned apertures 73 therein for receiving a locking pin or spike 74.

The return roller assemblies 15 are suspended and supported by the improved supporting structure 16 which in this modification of the invention has the primary support means 17 rigid in the form of the U-shaped brackets 68 which are secured to the mine roof R and the connector devices 18 are bodily flexible in the form of the lengths of chain 39 with each chain 39 being connected to the bracket 38 on the shaft 37 and to a lug 77 extending from the underside of each of the U-shaped brackets 68.

It may be noted with respect to FIGURES 4 and 5 that the return reach 12 need not be supported at each roof bolt 71, and need only be supported from such anchor point at spacings necessary to keep the sag in the return reach less than an undesired amount.

A still further modification of the improved supporting structure 16 is illustrated in FIG. 6 of the drawing wherein the elongated connector device 18 is bodily rigid and in the form of a single rigid link or rod 46 and the roller assembly may be connected to the primary support means 17 by the single link 46 which has a freely swivelable or universal connection 47 to the primary support means 17 and a similar freely swivelable or universal connection 48 to the end portion of the roller assembly through a connection such as the bracket 38 or the lug 52.

Also, FIGS. 6, 7 and 8 illustrate various modifications for depending and disposing the connector devices 18 from the respective primary support means 17 of this invention. As illustrated in FIG. 6, the connector device 18 is shown as being disposed in diverging relationship from the primary support means 17 with a similar connector device 18, not shown, which is connected at the other end of the roller assembly. We have found if the connector devices 18 are divergent in the fashion described, that the roller assemblies 14 and 15 may move in a direction to correct misalignment of the reaches 11 and 12 of the conveyor belt. For example, if the reach has moved laterally of itself to the right end of the return roller assembly, as seen in FIGURE 9, such right end portion of the roller assembly will move in a "downstream" direction while the left end of the roller assembly will move in an "upstream" direction. Such movement of the return roller assembly in the aforesaid manner will exert a corrective component of force on the reach to cause it to re-align itself.

As seen in FIGURE 7, if the connector devices 18 are connected to the primary support means 17 so that they extend substantially vertically, i.e., more vertical than horizontal, in the plane common to the longitudinal axis of the roller assembly, a similar re-training effect will be noted for the reach that is supported by the so suspended roller assembly but the effect will be to a lesser degree than if such connection is made as seen in FIGURE 6.

Likewise, if the connector devices 18 are connected in the fashion as seen in FIGURE 8, with the connector devices 18 being disposed in convergent relationship from their connection to the primary support means 17, there will be a re-training effect noted, but to a lesser extent than in the cases described with reference to FIGURES 6 and 7, above.

It may be noted that irrespective of whether the connector device 18 for suspending and supporting the roller assemblies 14 and 15 to the primary support means 17 is bodily flexible and of the form comprising a chain, or bodily rigid of the form comprising a single link freely swivelable at its ends, the re-training effect will be in accordance with the condition of divergency, parallelism, or convergency, above described. Also, irrespective of whether the form of the connector device 18 is bodily flexible or bodily rigid, the primary support means 17 may be flexible in the form of the rope strands 13 or rigid in the form of the standards 56 or rigid in the form of the U-shaped brackets 68 with the connection being made to the primary support means 17 at locations of convenience as dictated by the operating conditions of the belt conveyor 10.

As seen in FIGURE 9, an offcenter reach of the belt conveyor 10 is illustrated as longitudinally misaligned relative to the conveyor course having shifted to the right end of the roller assembly. The dotted line position of the roller assembly is the one corresponding to proper alignment of the reach, while the solid line position of the roller assembly is the one corresponding to its shifted position to correct the misalignment of the reach. It will be noted that the left end of the roller assembly has moved in an "upstream" direction while the right end has shifted in a "downstream" direction, as illustrated by the arrows, and such shifted position of the roller assembly will provide a re-training effect for the offcenter reach of the belt.

For the sake of brevity, only the return roller assembly 15 has been illustrated in FIG. 9 but it is to be understood that the troughing roller assembly 14 for the conveying reach 11 will shift in like manner to re-train an offcenter or misaligned condition in the conveying reach 11.

It will be noted from the description foregoing that there has been provided a belt conveyor where both the conveying and return reaches are supported by roller assemblies which are enabled to have movement in misalignment correcting directions. It will be noted that the conveying reach can be supported upon a troughing roller assembly having its ends connected by freely movable connector devices extending preferably in convergent directions to their point of support so as to provide swiveling movement of the roller assembly in a generally horizontal plane to correct misalignment of the conveying reach. In the case of the return reach, the return roller assemblies supporting same are likewise in turn suspended and supported by connector devices which may extend in upwardly convergent directions to correct any offcenter or misalignment of the return reach.

From the description foregoing it is also evident that the return reach need be supported only at locations necessary to prevent undue sag thereof, as may be dictated by the terrain over which the conveyor operates and the weight of the return reach.

While the invention has been described in terms of a number of preferred embodiments thereof, its scope is intended to be limited only by the claims here appended.

We claim as our invention:

1. A return roller assembly for supporting the return reach of a conveyor belt in a belt conveyor of the type having a pair of spaced, generally parallel sideframes extending along a conveyor course, means for supporting the sideframes, and a plurality of troughing idler assemblies carried by the sideframes and supporting the conveying reach of the conveyor belt, said return roller assembly being effective to train the return reach irrespective of, firstly, the direction of the movement of the return reach and, secondly, the behavior of the conveying reach of the belt, said return roller assembly including, in combination, a return roller, and means for suspending the return roller from the conveyor sideframes, said suspending means including a pair of elongated connectors, each elongated connector being universally connected to an associated end of the return roller and having a universal connection engageable with an associated conveyor sideframe at a location remote from the nearest troughing idler assembly, to thereby enable the return roller to be oriented into a belt training position in response to the passage of a belt thereover in a detrained condition, said elongated connectors, when not under the influence of a detrained conveyor belt passing thereover, being oriented in a vertical plane transverse to the conveyor course.

2. The apparatus of claim 1 further characterized in that the elongated connectors converge upwardly from the return roller to their point of connection to the conveyor sideframes.

3. The apparatus of claim 2 further characterized in that the elongated connectors are lengths of chain.

4. A belt conveyor, said belt conveyor including in combination, a pair of spaced generally parallel sideframes extending along a conveyor course, means for supporting the sideframes, a plurality of troughing idler assemblies carried by the sideframes and supporting the conveying reach of the conveyor belt, and a return roller assembly, said return roller assembly supporting the return reach of the flexible conveyor belt and being effective to train the return reach irrespective of, firstly, the direction of movement of the return reach and, secondly, the behavior of the conveying reach of the belt, said return roller assembly including, a return roller, means for suspending the return roller from the conveyor sideframes, said suspending means including a pair of elongated connectors, each elongated connector being universally connected to an associated end of the return roller and having a universal connection engageable with an associated conveyor sideframe at a location remote from the nearest troughing idler assembly, to thereby enable the return roller to be oriented into a belt training position in response to the passage of a belt thereover in a detrained condition, said elongated connectors, when not under the influence of a detrained conveyor belt passing thereover, being oriented in a vertical plane transverse to the conveyor course.

5. The apparatus of claim 4 further characterized in that the elongated connectors are lengths of chain.

6. A return roller assembly for training the return reach of a belt in a belt conveyor in response to passage of the return reach thereover in a detrained condition, said conveyor being of the type having return roller assemblies supporting the return reach of the belt from elevated support means, and troughing idler assemblies supporting the conveying reach of the belt, said return roller assembly being effective to train the return reach irrespective of, firstly, the direction of movement of the return reach, and secondly, the behavior of the conveying reach of the belt, said return roller assembly including, in combination, a return roller, and a pair of freely hanging, elongated connectors for suspending the return roller from the elevated support means in a generally horizontal position at a location remote from the nearest troughing idler assembly, the freely hanging, elongated connectors having means connectable to the elevated support means and having means providing a connection to the return roller to enable the end portions of the return roller to swing to and fro in the same or opposite directions in response to the passage of the return reach of the belt over the return roller in a detrained condition, said directions being generally parallel to the conveying course, said freely hanging, elongated connectors, when not under the influence of the detrained behavior of the belt passing thereover being oriented in a generally vertical plane transverse to the conveyor course.

References Cited in the file of this patent

UNITED STATES PATENTS

| Re. 24,611 | Stamos | Feb. 24, 1959 |
| 2,451,304 | Klein | Oct. 12, 1948 |
| 2,773,257 | Craggs et al. | Dec. 4, 1956 |
| 2,885,066 | Lo Presti | May 5, 1959 |

FOREIGN PATENTS

| 878,538 | France | Oct. 19, 1942 |
| 738,598 | Germany | Sept. 3, 1943 |